June 27, 1961 W. J. DENKOWSKI ET AL 2,989,878
VALVE ACTUATING MECHANISM
Filed March 25, 1959 5 Sheets-Sheet 1

INVENTORS
Walter J. Denkowski
Samuel I. Caldwell
BY
ATTY

June 27, 1961

W. J. DENKOWSKI ET AL 2,989,878

VALVE ACTUATING MECHANISM

Filed March 25, 1959

INVENTORS
Walter J. Denkowski
Samuel I. Caldwell

BY Arthur Middleton
ATTY

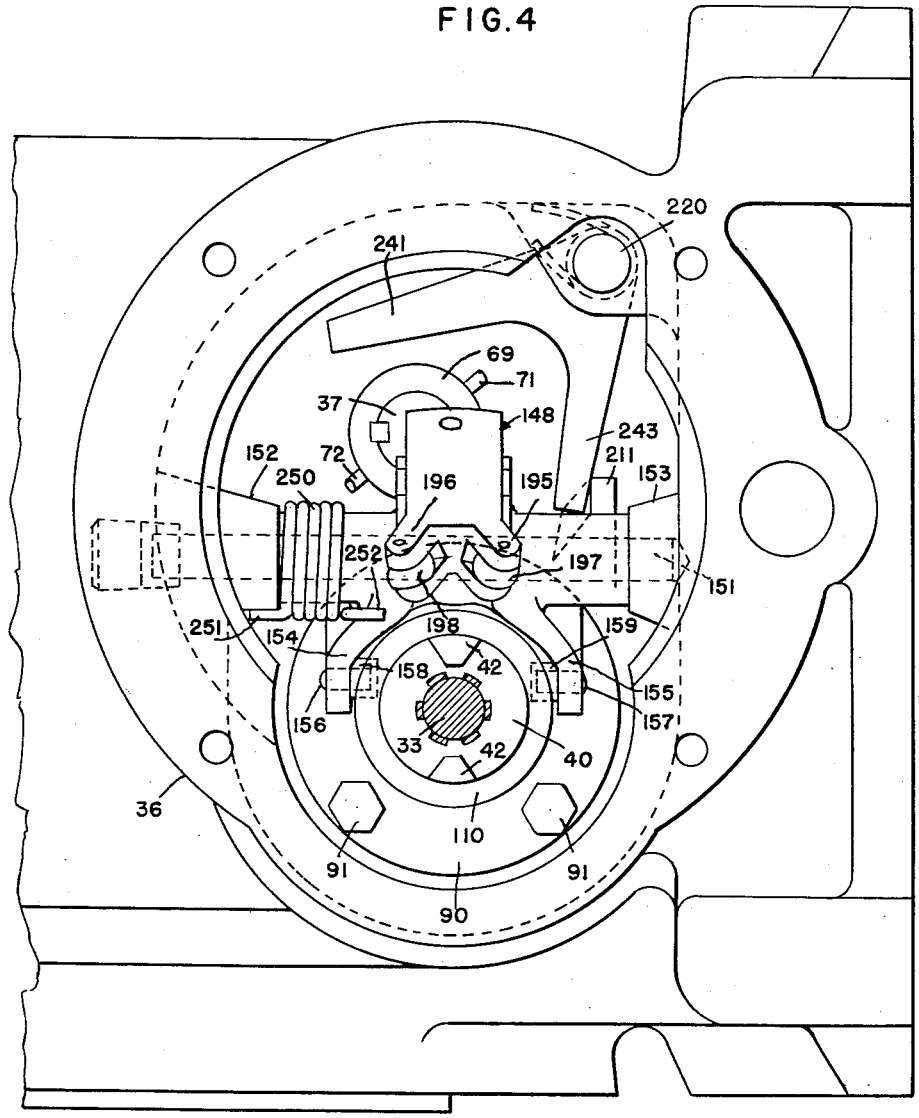

June 27, 1961  W. J. DENKOWSKI ET AL  2,989,878
VALVE ACTUATING MECHANISM

Filed March 25, 1959  5 Sheets-Sheet 4

INVENTORS
Walter J. Denkowski
BY Samuel I. Caldwell
ATTY

INVENTORS
Walter J. Denkowski
BY Samuel I. Caldwell

ATTY

United States Patent Office 2,989,878
Patented June 27, 1961

2,989,878
VALVE ACTUATING MECHANISM
Walter J. Denkowski, Huntington Valley, and Samuel I. Caldwell, Drexel Hill, Pa., assignors to Philadelphia Gear Corporation, Philadelphia, Pa., a corporation of Pennsylvania
Filed Mar. 25, 1959, Ser. No. 801,842
14 Claims. (Cl. 74—625)

This invention relates to motorized drive mechanisms for power operated valves which are operable at will either by hand or by power. More specifically, this invention relates to improvements in automatic, mechanical interlocking devices effective between the hand drive and power drive means for such mechanisms.

Valve actuating mechanisms of the kind herein contemplated are usually associated with gate valves having a screw threaded spindle or stem movable up and down by the rotation of a nut for opening and closing the gate, which nut is adapted for rotation either by power driving mechanism or by hand operation. Usually, the drive mechanism includes a worm shaft engageable with a worm gear which comprises the nut member, there being two selectively operable gear trains for effecting rotation of the worm shaft and one of which gear trains is hand manipulated and the other of which is driven by means of an electric motor or the like.

In the present invention, the gear train which operates the worm shaft by means of manual actuation is associated with mechanism which normally effects a driving relationship therebetween and which includes a shiftable clutching sleeve which is selectively shiftable to disengage the hand operated drive and to clutch the motor driven drive to the worm shaft in response to motor driven operation. In this manner, both drives cannot simultaneously be effected but the normal positioning of the assemblage is such as to effect the driving mechanism by means of hand actuation.

An object of this invention is to provide a device as described above in which the drive interrupting mechanism or clutch sleeve is shifted back and forth by mechanism which is of as simple form as is possible and without requiring the use of auxiliary levers or the like in its manipulation.

Another object of this invention is to provide a clutching mechanism which will be effective to permit the clutch sleeve to assume either of its operative positions regardless of the precise positioning of the hand operated drive or the motor operated drive. That is to say, the construction is such that the mechanical interlocking means which retains the clutch sleeve in one position or the other is so constructed and arranged that, whereas it is released in a simple manner, there is no possibility that its proper operation need require a precise or particular positioning of the mechanism associated therewith.

A further object of this invention is to provide a valve actuating mechanism including a selectively operable clutching device operable between plural input power paths which is shifted in response to energization of one of the power inputs and includes a flipper mechanism having a lost motion connection, which lost motion connection will permit return of the clutching device even though the cam for operating the flipper is in such position as would normally cause or prevent shifting of the clutching device.

A further object of this invention is to provide improved clutching means of the character described in which the operating mechanism therefor is so constructed and arranged as to prevent the inadvertent neutralizing of the clutching device, the same positively necessitating the positioning of the clutching device into either one of its two operative positions.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

In the drawings:

FIG. 4 is a vertical section, taken substantially along the plane of section line 4—4 in FIG. 3, and illustrating further details of the construction of the clutching mechanism;

Figures 1, 2, 10:
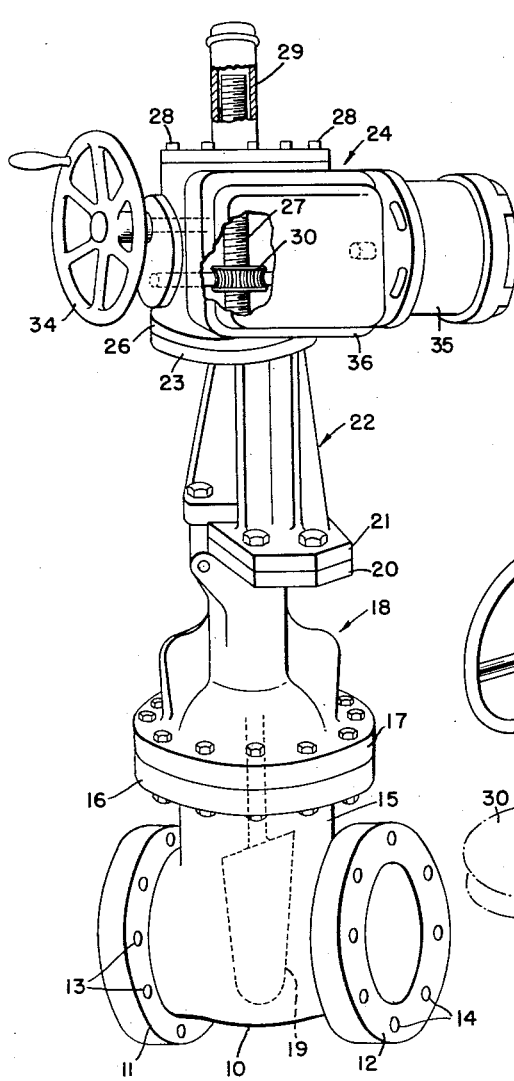
FIG. 1 is a perspective view of a valve assembly of conventional construction and having associated therewith the operating means in accordance with this invention.
FIG. 2 is a diagrammatic perspective view illustrating the gear train for effecting manual manipulation of the valve.
Figure 3:
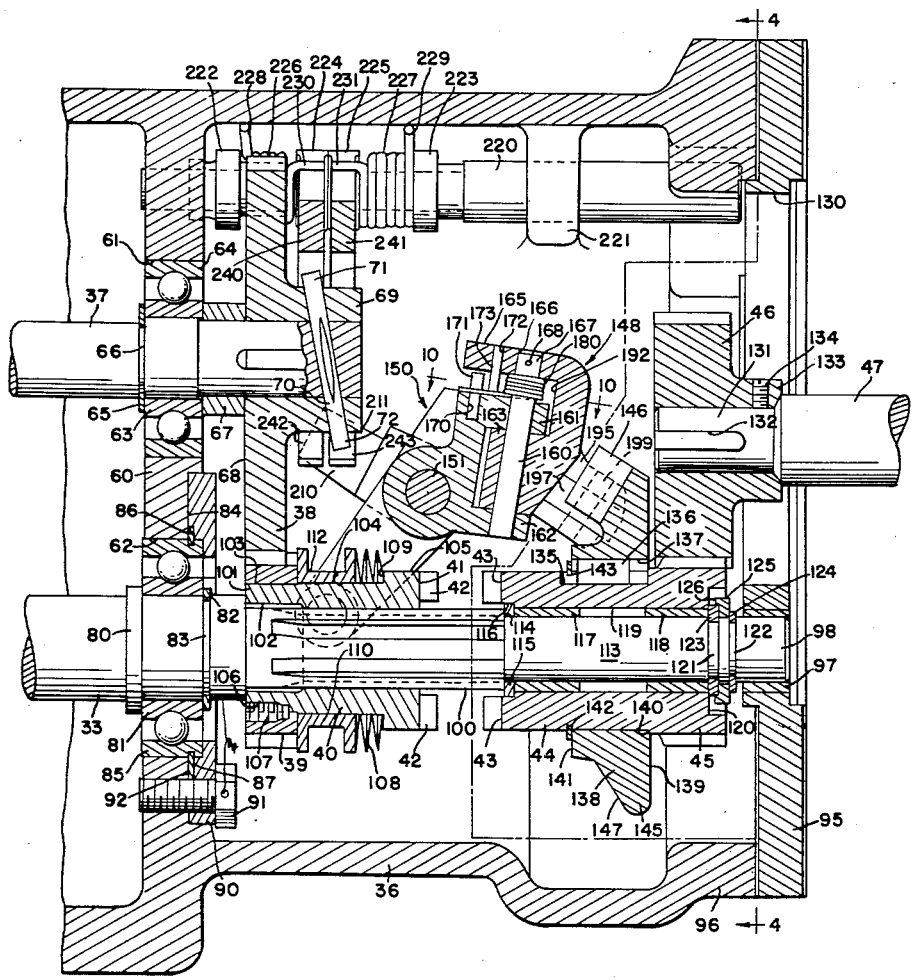
FIG. 3 is a sectional view, taken through a portion of the valve actuating mechanism and showing details of the clutching mechanism associated therewith and as constructed in accordance with this invention.
Figure 11:
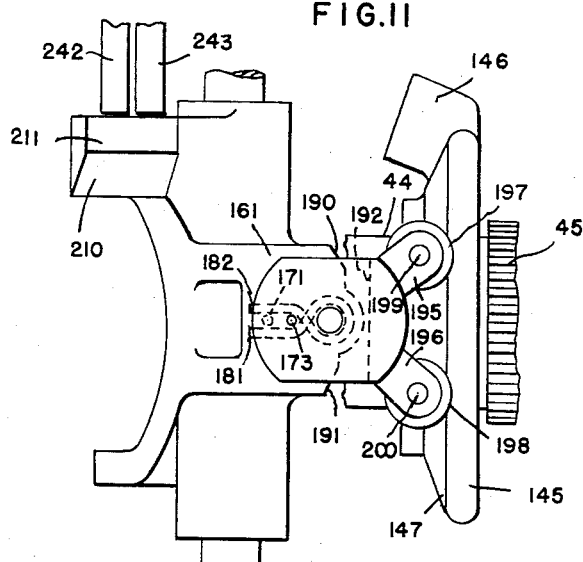
Figure 6:
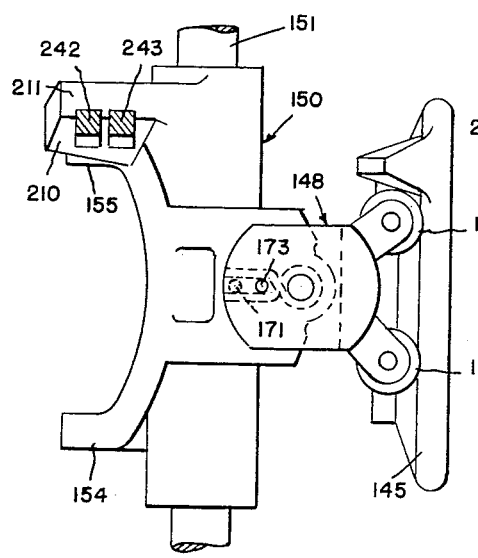
Figure 7:
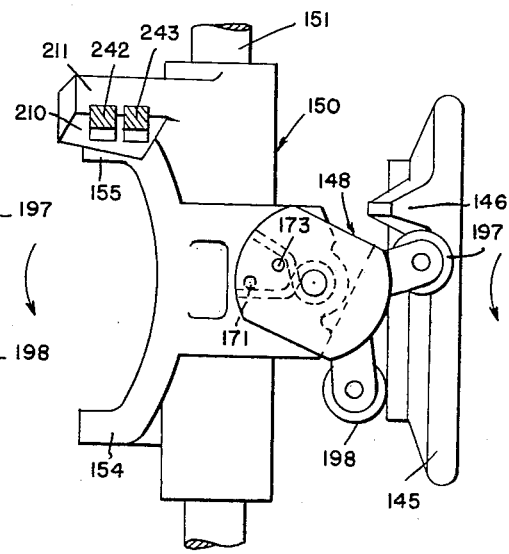
Figure 8:
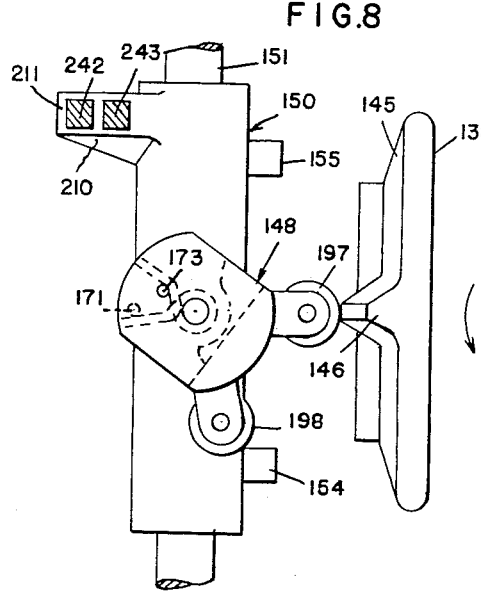
Figure 9:
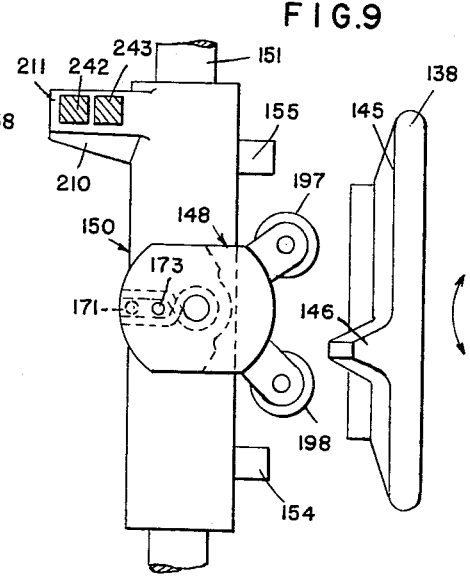

FIGS. 6, 7, 8 and 9 diagrammatically show sequential operation of the clutching mechanism actuated in response to the motor drive assembly to shift the clutch from its normal position effecting drive from the manual mechanism to the valve to operative connection such that the motor drive effects actuation of the valve;

FIG. 10 is an enlarged sectional view, taken substantially along the plane of section line 10—10 in FIG. 3, and showing the abutment shoulder relationship between the flipper and the clutch fork; and FIG. 11 is a view similar to FIG. 6 but showing the motor drive assembly stationary and the position of the component parts after commencement of manual operation.

Referring now more particularly to FIG. 1, the assembly shown therein consists primarily of conventional component parts including a gate valve body 10 having end flanges 11 and 12 suitably apertured at 13 and 14 by means of which the body may be bolted to corresponding end flanges on pipe sections with which the valve is to be associated. The body includes an upstanding portion 15 having a horizontal attaching flange 16 and to which is mated the horizontal flange 17 of an intermediate body section indicated generally by the reference character 18.

The body 10 is adapted to house a gate valve disc 19 indicated in phantom lines and the operation is such that this gate valve disc is reciprocated vertically with respect to the body 10 to open or close the valve or to establish any intermediate position thereof, as desired.

The upper portion of the body 18 is provided with a flange 20 mating with a similar flange 21 in the pedestal indicated generally by the reference character 22 and securely fastened thereto and the upper section of the pedestal 22 terminates in a further flange 23 upon which is mounted the actuating assembly indicated generally by the reference character 24, the same having a flange 26 mating with and rigidly affixed to the flange 23 of the pedestal.

The gate valve disc 19 has rigidly attached thereto a threaded spindle or stem 27 which projects upwardly therefrom through the sections 18 and 22 and through the actuating assembly 24. Bolted as by fasteners 28 to the upper side of the assembly 24 is a vertical tube or housing 29 which receives the upper end of the stem or spindle 27 and permits the same to be reciprocated up and down to permit the associated opening and closing action of the valve 19 in accordance with this position within the valve body 10.

Conventional means is associated with the spindle 27 to prevent its rotation with respect to the housings 10, 18 and 22 as well a with respect to the assembly 24 and threadedly engaged upon the spindle or stem is a nut 30 which, when rotated, will effect movement of the stem or spindle vertically either up or down, in accordance with the rotation of the nut. Although not shown, it is to be understood that means is provided for limiting the nut 30 within the assembly 24 such as to prevent its vertical movement so that when rotated, the spindle will be moved up or down, as the case may be.

As can be seen better in FIG. 2, the nut 30 is in the form of a worm wheel having its circumferential surface 31 provided with teeth which engage with the worm teeth 32 formed on or rigid with a worm shaft 33, which shaft, when rotated, will effect a corresponding rotation of the nut 30 and consequent movement of the spindle 27.

In accordance with conventional practice, the worm shaft 33 is operated either manually as by means of a hand wheel 34 or mechanically as by means of an electric motor 35, see particularly FIG. 1. The electric motor 35 is rigidly mounted upon the main housing 36 of the assembly 24 and is normally controlled remotely for effecting the desired manipulation of the valve disc 19. However, in the case of power failure or for other reasons when it is desirable to do so, the valve can be positioned manually through manipulation of the hand wheel 34. This is accomplished by virtue of the fact that the hand wheel 34 is rigid with a shaft 37 which, in turn, is rigidly connected to a gear 38 which meshes with a gear 39 which is rigidly connected with a clutch sleeve 40 which is splined to the worm shaft 33. The clutch sleeve 40 has its end face 41 provided with dogs 42 which are engageable within notches or recesses 43 formed in the end face of the hub 44 of gear 45 which is journalled upon the worm shaft 33. This gear 45 is in mesh with a drive gear 46 fixed to the drive shaft 47 of electric motor 35. By shifting the sleeve 40 back and forth along the worm shaft 33, the drive to this shaft can be effected either through the hand wheel 34 or by means of the electric motor 35, as desired.

The means for shifting the sleeve 40 and holding the same in its desired position or adjustment is the subject matter of this patent application.

Referring now more particularly to FIG. 3, it will be seen therein that the housing 36 forms a support for the two shafts 37 and 33. To this end, the housing 36 is provided with a wall 60 having suitable bearing openings 61 and 62 therein. The corresponding end of the shaft 37 projects through this wall through the opening 61 and is provided with a bearing assembly journalling the same in such opening 61. The inner race 63 of this bearing is seated upon the shaft and the outer race 64 thereof is seated within the opening 61. A retaining ring 65 is received in an annular groove 66 in shaft 37 and engages one face of the inner race 63, whereas the opposite face is engaged by a spacing collar 67 which is sandwiched between the inner race 63 and the corresponding face 68 of gear 38. The gear 38 is provided with a hub 69 which terminates substantially flush with the end of the shaft 37 and is affixed thereto by means of a key and keyways in the end of shaft 37 and hub of gear 38 and a pin 70 projecting therethrough at an angle as shown in FIG. 3, and with its opposite end portions 71 and 72 projecting obliquely outwardly of the hub 69 for a reason which will be presently apparent.

The worm shaft 33 is provided with a raised shoulder or collar 80 which bears against the inner race 81 of a bearing seated within the opening 62 and journalling the shaft relative to the housing 36. The opposite face of the inner race 81 is engaged by a retaining ring 82 received in circumferential groove 83 in the worm shaft, thereby preventing longitudinal shifting between the inner race bearing and the worm shaft. The inner face of the wall 60 is recessed as at 84 so that the outer race 85 of the bearing is of greater width than this recessed portion and, therefore, projects inwardly thereof. The outer race is provided with a circumferential groove 86 receiving a retaining ring 87 which projects radially from the outer race 85 and engages against the face of the recess 84. A retaining plate 90 is secured as by bolts 91 within the recess 84 and is provided with a circumferential notch 92 receiving the retaining ring 87 and thereby preventing longitudinal shifting of the outer race 85 with respect to the housing wall 60.

Opposite and parallel to the wall 60 is a plate 95 which is sandwiched between the electric motor 35 and the corresponding end face portion 96 of the housing and this plate carries a bushing 97 which receives the reduced end portion 98 of the worm shaft 33 and thus pilots the same therewithin.

The intermediate portion 100 of the worm shaft is splined and slidably engaged on this portion of the shaft is the internally splined collar 40. The collar 40 itself has one end portion 101 provided with a counterbore 102 which is of greater diameter than the intermediate portion of the shaft and the external surface 103 of this portion represents the smallest outside diameter of the collar, there being an intermediate portion 104 of slightly larger diameter and an opposite end portion 105 of still larger diameter. The gear 39 is fitted snugly on the portion 103 and abuts against the shoulder provided between the portions 103 and 104. To secure the gear in place fixedly upon the collar, a tapped hole 106 is provided, whose center lies along the parting surface between the gear and the collar and receives a locking screw 107, as shown in FIG. 3.

Before the gear 39 is engaged upon the collar 40, a compression spring 108 is engaged thereover, which bottoms against the shoulder 109 between the portions 104 and 105, and then a throw out ring or collar 110 is fitted upon the clutching collar. The throw out collar or ring fits loosely upon the clutching collar and is slidable therealong in opposition to the compression spring 108 and is provided with a circumferential groove 112 within which a throw out fork, hereinafter described, is engageable, whose purpose is to longitudinally shift the clutching collar along the intermediate portion 100 of the worm shaft. After the spring 108 and throw out ring 110 are positioned on the clutching collar 40, the gear 39 is positioned thereon and fixed thereto.

The portion 113 of the worm shaft which receives the gear 45 and its associated hub is of the same diameter as the end portion 98 thereof and, therefore, provides a shoulder 114 at its juncture with the intermediate portion 100. A bearing washer 115 is engaged over the shaft portion 113 and engages against this shoulder 114 and is received within a recess or counterbore 116 in the corresponding end of the hub 44. The internal diameter of the hub 44 is materially greater than the shaft portion 113 and bushings 117 and 118 are fitted within such enlarged bore 119 and serve to journal the hub and gear upon the shaft. The opposite end of the hub and gear assembly is counterbored as at 120 and the worm shaft in this area is provided with two circumferential grooves 121 and 122, the first of which receives the split thrust washer 123 and the second of which receives a retaining ring 124. A retaining washer 125 is sandwiched between the split ring 124 and the split washer 123 and has a portion 126 which surrounds the split washer 123 for the purpose of retaining the same in place, the retaining washer 125 having an internal diameter just slightly larger than the diameter of the shaft portions 98 and 113. The purpose of this retaining washer 125 is to retain the thrust washer 123 in place since the latter is preferably formed from two complemental half sections in order to be received within the corresponding groove 121 or it may be of a split type, but in any event, the retaining washer 125, by virtue of its embracing relationship with the thrust washer, serves to maintain the same properly in position on the shaft.

The motor drive shaft 47, as can be seen in FIG. 3, extends into the housing 36 through the enlarged opening 130 of the plate 95 and is provided with a reduced diameter end portion 131 having a keyway 132 therein receiving a key for feathering the gear 46 to such shaft. The hub 133 of the gear 46 is provided with a set screw 134 which engages the reduced end portion 131 of the motor shaft and thus prevents longitudinal shifting of the gear 46 relative to the shaft.

The hub 44 of gear 45 is provided with a keyway 135 and receives therein a key 136 which projects into the keyway 137 of a cam wheel 138, the rear face 139 of which engages against the shoulder 140 provided on the external surface of the gear hub. The opposite face 141 of the cam wheel is engaged by a retaining ring 142 which is seated within the circumferential groove 143 which is formed in the external surface of the gear hub 44 and thus positions the cam wheel 138 against longitudinal displacement relative to such hub. The cam wheel 138 is provided with a rim 145 having a laterally and upwardly projecting nose 146 on the inner sloped face 147 thereof, such nose being cooperable with a flipper assembly indicated generally by the reference character 148 hereinafter described and the purpose of which will be presently apparent.

The flipper assembly 148 is carried by the throw out or shifter assembly indicated generally by the reference character 150. The throw out assembly itself is pivotally carried by a transverse shaft 151 having its opposite ends received in bosses 152 and 153 which are integral with the housing 36, see particularly FIG. 4. The throw out assembly includes the downwardly divergent fork arms 154 and 155, which carry the inwardly directed pins 156 and 157 at their lower ends which are aligned with the circumferential groove 112 in the throw out ring or collar 110 and may carry trunnion elements 158 and 159 rotatably thereon which engage within the circumferential groove 112. Thus, rocking motion in one direction imparted to the assembly 150 will cause the throw out collar or ring 110 to move in opposition to the compression spring 108 and shift the clutching sleeve or collar 40 from the position shown in FIG. 3 wherein the gear 39 is engaged with the gear 38 to a position such as that shown in FIG. 5 wherein the teeth 42 are engaged in the notches 43 to thus couple the gear 45 to the worm shaft 33 so that motion of the worm shaft can be derived from the motor driving assembly.

The compression spring 108 acts as a shock absorber at such time as the throw out or shifter assembly 150 initiates movement of the clutch assembly 40, thus absorbing impact loads on the clutch and shifter assemblies. It also acts as a shock absorber when the shift is completed, that is, after the teeth 42 have engaged with the notches 43 and at such time as the clutch assembly 40 ceases to move axially on the shaft 33. At this instant, the momentum of the throw out or shifter assembly 150 has not yet been dissipated and, therefore, assembly 150 has a tendency to continue to rotate in the same direction against the urging of the torsion spring 250. Naturally, the spring 250 at all times acts in opposition to movement of the assembly 150 and the associated clutch 40 towards the clutching position in which the teeth 42 are engaged within the notches 43 and the spring 108 acts cumulatively with the spring 250 as soon as the teeth 42 are bottomed within the notches 43 to resist the momentum of the assemblies 150 and 40.

The spring 108 also acts as a lost motion connection between the assembly 150 and the clutch 40 under the condition in which the teeth 42 are not aligned properly with the notches 43 and will prevent impact loading under such condition and, at the same time, will increase the clutching pressure tending to urge the teeth into the recesses of notches 43 which will occur as soon as the teeth are properly aligned with the recesses.

The flipper assembly 148 is rotatable a limited amount with respect to the throw out assembly 150 about the axis of a pivot pin 160 which is carried between the upper and lower legs 161 and 162 of the throw out assembly 150. These legs 161 and 162 are spaced apart in the manner shown most clearly in FIG. 3 and receive therebetween the knuckle portion 163 of the flipper assembly which is provided with a bore through which the pin 160 projects. The flipper assembly also includes an upper arm 165 overlying and spaced above the upper leg 161 of the throw out assembly and has an opening 166 therein receiving the upper end 167 of the pins 160 and is preferably pinned thereto as indicated by the reference character 168 to prevent shifting of the pin 160. The upper surface of the leg 161 of the throw out assembly is provided with a recess 170 snugly receiving an upstanding pin 171 and the leg 165 is provided with a bore 172 carrying a depending pin 173. About that portion of the pin 160, which is exposed between the leg 161 and the leg 165, is the loop or coil portion 180 of a spring having radial projections 181 and 182 straddling the two pins 171 and 173 to normally position the flipper 148 relative to the throw out assembly in a manner indicated best in FIG. 11 and tending to always return the flipper to this position relative to the throw out assembly, while at the same time permitting of limited oscillation or rotation therebetween, the purpose of which will be presently apparent. To limit the amount by which the flipper 148 may oscillate with respect to the throw out assembly 150, the leg 161 of the latter is provided with beveled stop shoulders 190 and 191, see particularly FIG. 11, which are engageable with the inner face 192 of the flipper assembly.

The flipper assembly also includes a pair of outwardly divergent bifurcated arms 195 and 196 receiving rollers 197 and 198 between the bifurcated portions in the free ends thereof and which rollers are rotatably carried by such arms through the medium of axles 199 and 200 fixed to and extending between such bifurcations. These rollers 197 and 198 are adapted to be engaged by the cam nose 146 which will cause a rotating motion, hereinafter more particularly described, of the throw out assembly 150 on shaft 151, to effect the shifting of the clutch sleeve 40.

As can also be best seen in FIG. 11, the throw out assembly 150 includes a latching bar 210 which projects rearwardly therefrom and which is provided with a flat upper surface 211 of relatively narrow width, the purpose of such latching bar being presently apparent.

A rocker shaft 220 is located within the housing 36, see particularly FIG. 3, and is journalled at one end in the wall 60 and is further journalled to the housing by means of a web 221 as shown. The rocker shaft 220 is provided with a pair of spaced enlarged shoulders 222 and 223 and journalled on this shaft intermediate these shoulders is a pair of V-shaped latching levers 224 and 225 which are independently rotatable or rockable thereon. A pair of spring assemblies is associated with the respective latching levers 224 and 225 to normally urge them for counterclockwise rotation as view in FIG. 4, these spring assemblies including the coiled portions 226 and 227 wound about the rocker shaft 220 and each of which has one end 228 and 229 extending radially therefrom to engage against the inner surface of the housing 36. The opposite ends 230 and 231 of these springs are laterally bent to engage upon the respective latching levers 224 and 225 and these springs are pretensioned to effect the loading thereof such as to urge the latching levers in the abovementioned counterclockwise direction as viewed in FIG. 4.

The latching levers include the upper arm portions 240 and 241 and the lower arm portions 242 and 243. The upper arm portions 240 and 241 are, in the hand drive position of the mechanism, elevated from the outer surface of the hub 69 of gear 38, as shown in FIG. 4, but these upper arm portions are adapted to come to rest upon this hub when the mechanism is in the power drive position, or is set for power drive, at which latter time the lower arm portions 242 and 243, or one of such portions, will be engaged against the upper surface 211 of the latching bar 210, in the manner and for the purpose hereinafter described. In the positions of the parts illustrated in FIGS. 3 and 4, when the hand shaft 37, and consequently the gear 38, are rotated, the end portions 71 and 72 of the pin 70 will sequentially pass under and along the undersides of first one and then the other of the upper arm portions of the latching levers 224 and 225, in a clockwise direction. The free ends of the lower arm portions 242 and 243 are utilized for the purpose of engaging over the latching bar 210 of the throw out assembly 150 when the bar is in the position as shown in FIG. 5 and engaging the upper surface 211 thereof to prevent relative movement of this throw out assembly which would otherwise occur by virtue of the pretensioning spring 250, see particularly FIG. 4, which has its opposite end portions 251 and 252 engaging respectively with the boss 152 of the housing 36 and the body of the throw out assembly itself which normally tends to urge the throw out assembly in a direction to engage the gear 39 with the gear 38.

With the parts in the positions shown in FIGS. 3 and 4, for hand operation, assume that it is desired to operate the valve by means of the electric motor 35. The electric motor 35 is energized, which rotates the shaft 47 and consequently the gear 46 which is in constant mesh with the gear 45 and will rotate the same upon the worm shaft 33, carrying with it the cam wheel 138. When the nose 146 of the cam wheel engages the roller 197 or 198, dependent upon the direction of rotation of the shaft 47, the flipper assembly 148 will at first merely rotate relative to the throw out assembly 150 as can be best seen in FIGS 6 and 7, until the flipper can no longer rotate relative to the throw out assembly by virtue of engagement of the stop shoulders 190 or 191 with the flipper assembly surface 192. As soon as this position has been reached, further rotation of the cam wheel 138 will cause the throw out assembly 150 to rock from the position in FIG. 3 to the position as shown in FIG. 5, thus causing the gear 39 to be disengaged from the gear 38, breaking the manual drive and shifting the sleeve 40 so as to engage the teeth 42 within the notches 43 in the gear hub 44 which couples the hub 44 and, consequently, the gear 45 to the worm shaft 33, completing the mechanical connection between the motor shaft 47 and the worm shaft 33.

It should be noted at this point that the spring 108 provides a lost motion connection between the collar 110 and the clutch 40 at such time as the teeth 42 engage against the outer end of the gear hub 44 and not within the detents 43. That is to say, when the teeth 42 are out of alignment with the notches 43, the spring 108 permits the assembly 150 to nevertheless complete its motion and obviates arresting the rocking motion of assembly 150 which would occur were the collar 112 not axially shiftable along the clutch 40. The reason for this is to permit, in any event, sufficient rotation or rocking of the assembly 150 as to permit either one or the other of the latching arms 242 and 243 to engage over the upper surface 211 of the latching bar 210 regardless of whether the teeth 42 are aligned with the notches 43 or not. This assures that the latching action will always occure regardless of whether the teeth 42 are initially aligned with the notches 43 or not. Of course, at any such time as the misalignment is present, it will only be of short duration inasmuch as relative rotation between the clutch 40 and the hub 44 will immediately cause proper alignment and permit engagement of the teeth 42 into the notches or recesses 43.

Figure 5:
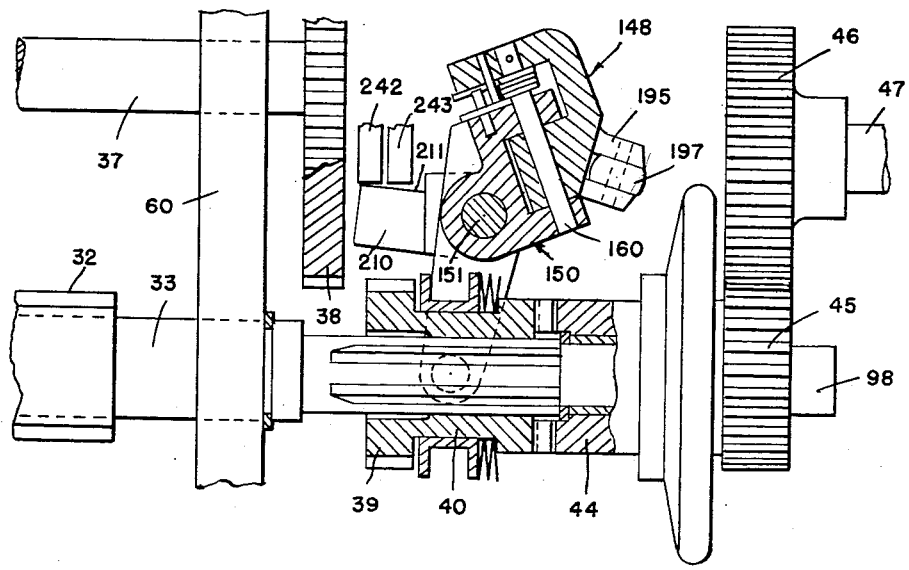
FIG 5 is a diagrammatic elevational view illustrating the position of the component parts of the clutching mechanism when the same is in position to couple the motor drive to the worm shaft for actuating the valve.

When the throw out assembly 150 has reached the position shown in FIG. 5, the bar 210 thereof will have swung lower than the lower ends of the arms 242 and 243 of the latching levers so that their associated tensioning springs will have caused either one or both to have swung in a counterclockwise direction to overlie the bar 210 such that when the cam nose 146 disengages whichever roller 197 or 198 it had initially engaged, the upper surface 211 of the bar 210 will be engaged by one or the other of the latching lever arms 242 or 243. If the hand wheel shaft 37 is in position such that the pin ends 71 or 72 prevent either of the arms 242 or 243 from engaging the surface 211, the other one will always be permitted to move into engagement therewith so that it is positively assured that one or the other of the latching lever arms will be engaged wtih the surface 211. At the same time, it is to be observed that in the case that both arms 242 and 243 are in a position to engage the surface 211, only one of them, namely, the arm 242 as shown in FIG. 5, will actually engage the surface 211. As is clearly illustrated in FIG. 5, this is true by virtue of the fact that the surface 211 is slightly inclined from the horizontal in the direction shown, while both arms 242 and 243 are of the same length. Obviously, the same result exactly could be accomplished by having one of the arms longer than the other, even to the extent of having arm 243 sufficiently longer than the arm 242 as to permit only this latter arm 243 from engaging the surface 211 when both arms are in a position above such surface. In any event, the operation remains the same so long as when both arms are in position, only one of them actually performs the latching action. When it is once again desired to operate by the hand wheel, the pin end 71 will first engage the latching lever arm 240 to swing the opposite arm 242 thereof out of engagement with the surface 211 which will permit a slight return rocking action of the throw out assembly 150 until the other arm 243 engages the surface 211, whereafter continued rotation of the hand shaft 37 will cause the pin end 72 to engage the arm 241 and disengage the opposite arm 243 from the surface 211. In the meantime, the arm 242 cannot return to its engaged position with the surface 211 by virtue of the slight return rocking action of the throw out assembly 150 which occurred when the arm 242 first disengaged the surface 211. Of course, it will be appreciated that, under some circumstances, only the arm 243 will have been performing the latching action and in such case, as soon as it is cammed away from the bar 210, the return action of the rocking assembly 150 will be permitted. On the other hand, it will, of course, be realized that dependent upon the position of the pin 70 with relation to the two arms 240 and 241, the sequence of their actuation is thereby controlled. For example, when returning to hand wheel operation, initial turning of the hand wheel may first move the arm 241 and, consequently, its associate arm 243 away from the surface 211, leaving arm 242 still in latching position and after the pin end 72 passes the arm 243, the arm will naturally be permitted to return once again to locking position since, in any case, the complete release of the latching mechanism when both arms 242 and 243 are in the latching position, must necessarily be initiated by the first cammed movement of arm 242 away from the surface 211 by its associated pin end 71, the two arms 242 and 243 being moved out of phase by a magnitude of 180° of rotation of shaft 37.

The flipper assembly 148 is rotatable with respect to the throw out assembly 150 not only for the purpose of permitting the rollers 197 and 198 to be assured of movement out of the path of the cam nose 146 when the motor drive is being used, but also to permit the throw out assembly 150 to return to its normal position as shown in FIG. 3, even though the cam nose 146 may be so positioned as to be in the path of one or the other of the rollers 197 or 198, in which case the roller in question would merely engage the cam nose and rotate the flipper assembly so as to permit the return normal positioning of the clutch sleeve 40.

By virtue of the fact that the flipper assembly is pivotally mounted on the throw out assembly with the bifurcated roller arms being divergent therefrom in a substantially radial direction as related to the pivot axis of the flipper assembly, the action of the cam wheel and the associated cam lobe or nose is such as to throw the flipper assembly until such time as the stop shoulders or faces engage at which point the lever arm being acted upon is substantially normal to the plane containing the cam wheel and, therefore, the position to which the throw out assembly is rocked about its axis is considerably greater than would be achieved by a fixed flipper assembly, and then when the cam wheel rotates so that its nose 146 passes beyond the roller being acted upon, the flipper assembly will return under the action of its associated spring to its normal position, at which point the rollers will be displaced sufficiently from the cam wheel as to prevent the cam nose from hitting either of the rollers during subsequent rotation thereof. That is to say, the pivoted flipper assembly permits clearance between the same and the cam wheel, as will be readily apparent.

It is to be understood that, although it is not intended that the hand wheel be rotated during motor operation, such action nevertheless will not cause any harm to either the operator or the mechanism but will effect only a momentary disengagement of the motor drive and an instantaneous re-engagement of the motor drive. In other words, it is mechanically impossible for the mechanism to be placed in a neutral position or to cause sustained disengagement from the motor drive when such motor drive is in operation.

It is to be noted in FIG. 5 that the bar 210 has its upper surface 211 inclined slightly with respect to the horizontal. The purpose of this is to render the unlatching action of the arms 242 and 243 easier. This occurs by virtue of the fact that the lower extremities of these arms 242 and 243 are flat or horizontal and by inclining the surface 211, a relatively small surface area of contact or engagement will be effected between the arms and such surface 211, making it easier to unlatch these arms as compared to a condition in which the entire end surfaces of the arms engage the surface 211. Of course, this could be accomplished in many ways, such as by rounding the ends of the arms or by forming them flat but at an angle to the horizontal while retaining a horizontal position of the surface 211, or by any other equivalent means.

We claim:

1. In an assembly for actuating mechanism having an axially shiftable stem, means for moving said stem selectively manually and mechanically, said means including a driven shaft directly operatively coupled to said stem and common to both mechanical and manual operation of the stem, a manually operable drive shaft, and a mechanically operable drive shaft having means for rotating the same, a first drive gear fixed to said manually operable drive shaft, a second drive gear fixed to said mechanically operable drive shaft, a clutching sleeve slidable along said driven shaft and rotatably carried thereby, a first driven gear fixed to said sleeve, a second driven gear journalled on said driven shaft, a cam element operatively connected with and rotatable with the second driven gear, and mechanism engaged and driven by said cam upon rotation of the latter for shifting said sleeve along said driven shaft between a first position in which said first driven gear is in mesh with said first drive gear and a second position in which said sleeve couples said second driven gear to said driven shaft for releasably securing the sleeve against reverse movement.

2. In an assembly for actuating mechanism having an axially shiftable stem, means for moving said stem selectively manually and mechanically, said means including a driven shaft directly operatively coupled to said stem and common to both mechanical and manual operation of the stem, a manually operable drive shaft, and a mechanically operable drive shaft having means for rotating the same, a first drive gear fixed to said manually operable drive shaft, a second drive gear fixed to said mechanically operable drive shaft, a clutching sleeve slidable along said driven shaft and rotatably carried thereby, a first driven gear fixed to said sleeve, a second driven gear journalled on said driven shaft, and means for shifting said sleeve along said driven shaft between a first position in which said first driven gear is in mesh with said first drive gear and a second position in which said sleeve couples said second driven gear to said driven shaft, the last mentioned means including a throw out assembly engaging said sleeve and rockable to move the sleeve between the two specified positions, a flipper assembly carried by said throw out assembly and having a cam follower thereon, a cam wheel rotatable with said second driven gear and carrying a cam nose positioned for striking engagement with said cam follower to rockably drive the throw out assembly and the sleeve to move said sleeve to said second position, means for releasably holding said sleeve in said second position, means normally urging said throw out assembly in a reverse direction to shift said sleeve to said first position thereof, and means for actuating said releasable means to permit said urging means to function.

3. In an assembly for actuating mechanism having an axially shiftable stem, means for moving said stem selectively manually and mechanically, said means including a driven shaft directly operatively coupled to said stem and common to both mechanical and manual operation of the stem, a manually operable drive shaft, and a mechanically operable drive shaft having means for rotating the same, a first drive gear fixed to said manually operable drive shaft, a second drive gear fixed to said mechanically operable drive shaft, a clutching sleeve slidable along said driven shaft and rotatably carried thereby, a first driven gear fixed to said sleeve, a second driven gear journalled on said driven shaft, and means for shifting said sleeve along said driven shaft between one position in which said first driven gear is in mesh with said first drive gear and a second position in which said sleeve couples said second driven gear to said driven shaft, the last mentioned means including a throw out assembly engaging said sleeve and rockable to move the sleeve between the two specified positions, a flipper assembly pivotally carried by said throw out assembly and having a cam follower thereon, a cam wheel rotatable with said second driven gear and carrying a cam nose engageable with said cam follower to rock the throw out assembly and move said sleeve to said second position, means normally urging said throw out assembly to rock in a reverse direction to shift said sleeve to said one position thereof, and a latching means for holding said throw out assembly against reversal to retain said sleeve in said second position thereof.

4. In an assembly for actuating mechanism having an axially shiftable stem, means for moving said stem selectively manually and mechanically, said means including a driven shaft directly operatively coupled to said stem and common to both mechanical and manual operation of the stem, a manually operable drive shaft, and a mechanically operable drive shaft having means for rotating the same, a first drive gear fixed to said manually operable drive shaft, a second drive gear fixed to said mechanically operable drive shaft, a clutching sleeve slidable along said driven shaft and rotatably carried thereby, a first driven gear fixed to said sleeve, a second driven gear journalled on said driven shaft, and means for shifting said sleeve along said driven shaft between a first position in which said first driven gear is in mesh with said first drive gear and a second position in which said sleeve couples said second driven gear to said driven shaft, the last mentioned means including a throw out assembly engaging said sleeve and rockable to move the sleeve between the two specified positions, a flipper assembly carried by said throw out assembly and having a cam follower thereon, a cam wheel rotatable with said second driven gear engageable with said cam follower to rock the throw out assembly and move said sleeve to said second position, tensioned means normally yieldingly urging said throw out assembly in a direction to shift said sleeve to said first position thereof, and latching means for holding said throw out assembly against movement by said tensioned means to retain said sleeve in said second position thereof, said latching means including a lever arm normally yieldingly urged in a direction relative to said throw out assembly to engage therewith at such time as the throw out assembly is rocked to move the sleeve to its second position to hold the throw out assembly in such rocked position, and means carried by said first drive gear for moving said lever arm out of latched engagement with the throw out assembly to rock in response to rotation of the first drive gear and permit said tensioned means to actuate the throw out assembly for reversely shifting the sleeve to its first position.

5. In an assembly for actuating mechanism having an axially shiftable stem, means for moving said stem selectively mechanically and manually, said means including a driven shaft directly operatively coupled to said stem and common to both mechanical and manual operation of the stem, a manually operable drive shaft, a mechanically operable drive shaft having means for rotating the same, a first drive gear fixed to said manually operable drive shaft, a second drive gear fixed to said mechanically operable drive shaft, a clutching sleeve slidable along said driven shaft and carried thereby for rotation therewith, a first driven gear fixed to said sleeve, a second driven gear journalled on said driven shaft, means for shifting said sleeve along said driven shaft between a first position in which said first driven gear is in mesh with said first drive gear and a second position in which said sleeve couples said second driven gear to said driven shaft, the last mentioned means including a throw out assembly having a fork coupled to said sleeve and rockable to move the sleeve between the two specified positions, a flipper assembly pivotally mounted on said throw out assembly and having a cam follower projecting therefrom, a cam wheel operatively coupled to and rotatable with said second driven gear and having a portion engageable against said cam follower to pivot the flipper assembly upon the throw out assembly, the throw out assembly and flipper assembly having abutment surfaces thereon engageable as said flipper assembly is pivoted to limit pivoting of the flipper assembly and impart rocking motion to said throw out assembly in a direction to shift said sleeve to said second position, means for releasably holding said sleeve in said second position, means normally urging said throw out assembly in a reverse direction to shift said sleeve to said first position thereof, and means for actuating said releasable means to permit said urging means to function.

6. In an assembly for actuating mechanism having an axially shiftable stem, means for moving said stem selectively mechanically and manually, said means including a driven shaft directly operatively coupled to said stem and common to both mechanical and manual operation of the stem, a manually operable drive shaft, a mechanically operable drive shaft having means for rotating the same, a first drive gear fixed to said manually operable drive shaft, a second drive gear fixed to said mechanically operable drive shaft, a clutching sleeve slidable along said driven shaft and carried thereby for rotation therewith, a first driven gear fixed to said sleeve, a second driven gear journalled on said driven shaft, means for shifting said sleeve along said driven shaft between a first position in which said first driven gear is in mesh with said first drive gear and a second position in which said sleeve couples said second driven gear to said driven shaft, the last mentioned means including a throw out assembly having a fork coupled to said sleeve and rockable to move the sleeve between the two specified positions, a flipper assembly pivotally mounted on said throw out assembly and having a cam follower projecting therefrom, a cam wheel operatively coupled to and rotatable with said second driven gear and having a portion engageable against said cam follower to pivot the flipper assembly upon the throw out assembly, the throw out assembly and flipper assembly having abutment surfaces thereon engageable as said flipper assembly is pivoted to limit pivoting of the flipper assembly and impart rocking motion to said throw out assembly in a direction to shift said sleeve to said second position, means normally urging said throw out assembly to rock in a reverse direction to shift said sleeve to said first position thereof, and a latching means for holding said throw out assembly to retain said sleeve in said second position thereof.

7. In an assembly for actuating mechanism having an axially shiftable stem, means for moving said stem selectively mechanically and manually, said means including a driven shaft directly operatively coupled to said stem and common to both mechanical and manual operation of the stem, a manually operable drive shaft, a mechanically operable drive shaft having means for rotating the same, a first drive gear fixed to said manually operable drive shaft, a second drive gear fixed to said mechanically operable drive shaft, a clutching sleeve slidable along said driven shaft and carried thereby for rotation therewith, a first driven gear fixed to said sleeve, a second driven gear journalled on said driven shaft, means for shifting said sleeve along said driven shaft between a first position in which said first driven gear is in mesh with said first drive gear and a second position in which said sleeve couples said second driven gear to said driven shaft, the last mentioned means including a throw out assembly having a fork coupled to said sleeve and rockable to move the sleeve between the two specified positions, a flipper assembly pivotally mounted on said throw out assembly and having a cam follower projecting therefrom, a cam wheel operatively coupled to and rotatable with said second driven gear and having a portion engageable against said cam follower to pivot the flipper assembly upon the throw out assembly, the throw out assembly and flipper assembly having abutment surfaces thereon engageable as said flipper assembly is pivoted to limit pivoting of the flipper assembly and impart rocking motion to said throw out assembly in a direction to shift said sleeve to said second position, means normally urging said throw out assembly to rock in a reverse direction to shift said sleeve to said first position thereof, latching means for holding said throw out assembly to retain said sleeve in said second position thereof, said latching means including a lever arm normally urged in a direction relative to said throw out assembly to engage therewith at such time as the throw out assembly is rocked to move the sleeve to its second position to hold the throw out assembly in such rocked position, and means carried by said first drive gear for engaging and moving said lever arm out of latched engagement with the throw out assembly in response to rotation of the first drive gear.

8. An assembly for actuating mechanism of the character described, comprising a casing having a threaded spindle projecting therethrough, an internally threaded worm wheel on said spindle, a worm shaft having a worm gear thereon in mesh with said worm wheel, a manually operable drive shaft journalled in said casing and projecting outwardly thereof, said manually operable drive shaft having a hand wheel fixed thereto externally of said casing and being provided with a first drive gear internally of the casing, an electric motor mounted on said casing and having a drive shaft projecting therefrom into the casing and having a second drive gear fixed thereto, a clutching sleeve splined to said worm shaft so as to be axially slidable thereon, a first driven gear rigid with said clutching sleeve and being in mesh with said first drive gear in a first position of said sleeve on the worm shaft, a second driven gear journalled on said worm shaft in mesh with said second drive gear, said clutching sleeve having means thereon engageable with the second driven gear in a second position of said sleeve to couple said second driven gear to the worm shaft, and means for shifting said sleeve between the two stated positions thereof, said means comprising a throw out assembly pivotally mounted within said casing and having a throw out fork rigid therewith, a throw out ring on and encircling said clutching sleeve, said throw out fork engaging said ring whereby rocking motion of the throw out assembly will move said sleeve between its two stated positions a cam wheel rigid with said second driven gear and having a cam nose thereon, a flipper assembly pivotally mounted on said throw out assembly and including a cam follower projecting therefrom and engageable with said cam wheel and positioned to be struck by the said cam nose as said second driven gear and consequently the cam wheel are rotated, abutment means on said flipper assembly and throw out assembly engageable upon pivotal movement of said flipper assembly to effect rocking of the throw out assembly as said cam follower is struck by said cam nose to shift said clutching sleeve from a position in which said first driven gear is in mesh with said first drive gear to a position in which said second driven gear is coupled to the worm shaft, means urging reverse shifting of said sleeve following coupling of the second drive gear to the worm shaft, means releasably holding said sleeve against movement by said urging means, and means for removing said holding means upon turning of the manually operab'e drive shaft.

9. An assembly for actuating mechanism of the character described, comprising a casing having a threaded spindle projecting therethrough, an internally threaded worm wheel on said spindle, a worm shaft having a worm gear thereon in mesh with said worm wheel, a manually operable drive shaft journalled in said casing and projecting outwardly thereof, said manually operable drive shaft having a hand wheel fixed thereto externally of said casing and being provided with a first drive gear internally of the casing, an electric motor mounted on said casing and having a drive shaft projecting therefrom into the casing and having a second drive gear fixed thereto, a clutching sleeve splined to said worm shaft so as to be axially slidable thereon, a first driven gear rigid with said clutching sleeve and being in mesh with said first drive gear in a first position of said sleeve on the worm shaft, a second driven gear journalled on said worm shaft in mesh with said second drive gear, said clutching sleeve having means thereon engageable with the second driven gear in a second position of said sleeve to couple said second driven gear to the worm shaft, and means for shifting said sleeve between the two stated positions thereof, said means comprising a throw out assembly pivotally mounted within said casing and having a throw out fork rigid therewith, a throw out ring on and encircling said clutching sleeve, said throw out fork engaging said ring whereby rocking motion of the throw out assembly will move said sleeve between its two stated positions, a cam wheel rigid with said second driven gear and having a cam nose thereon, a flipper assembly pivotally mounted on said throw out assembly and including a cam follower projecting therefrom and engageable with said cam wheel and positioned to be struck by the said cam nose as said second driven gear and consequently the cam wheel are rotated, abutment means on said flipper assembly and throw out assembly engageable upon pivotal movement of said flipper assembly to effect rocking of the throw out assembly as said cam follower is struck by said cam nose to shift said clutching sleeve from a position in which said first driven gear is in mesh with said first drive gear to a position in which said second driven gear is coupled to the worm shaft, means urging reverse shifting of said sleeve following said coupling of the second driven gear to the worm shaft, means for latching said throw out assembly in position to hold said clutching sleeve in its last mentioned position, and means for releasing said latching means.

10. An assembly for actuating mechanism of the character described, comprising a casing having a threaded spindle projecting therethrough, an internally threaded worm wheel on said spindle, a worm shaft having a worm gear thereon in mesh with said worm wheel, a manually operable drive shaft journalled in said casing and projecting outwardly thereof, said manually operable drive shaft having a hand wheel fixed thereto externally of said casing and being provided with a first drive gear internally of the casing, an electric motor mounted on said casing and having a drive shaft projecting therefrom into the casing and having a second drive gear fixed thereto, a clutching sleeve splined to said worm shaft so as to be axially slidable thereon, a first driven gear rigid with said clutching sleeve and being in mesh with said first drive gear in a first position of said sleeve on the worm shaft, a second driven gear journalled on said worm shaft in mesh with said second drive gear, said clutching sleeve having means thereon engageable with the second driven gear in a second position of said sleeve to couple said second driven gear to the worm shaft, and means for shifting said sleeve between the two stated positions thereof, said means comprising a throw out assembly pivotally mounted within said casing and having a throw out fork rigid therewith, a throw out ring on and encircling said clutching sleeve, said throw out fork engaging said ring whereby rocking motion of the throw out assembly will move said sleeve between its two stated positions, a cam wheel rigid with said second driven gear and having a cam nose thereon, a flipper assembly pivotally mounted on said throw out assembly and including a cam follower projecting therefrom and engageable with said cam wheel and positioned to be struck by the said cam nose as said second driven gear and consequently the cam wheel are rotated, abutment means on said flipper assembly and throw out assembly engageable upon pivotal movement of said flipper assembly to effect rocking of the throw out assembly as said cam follower is struck by said cam nose to shift said clutching sleeve from a position in which said first driven gear is in mesh with said first drive gear to a position in which said second driven gear is coupled to the worm shaft, means urging reverse shifting of said sleeve following the said coupling of the second driven gear to the worm shaft, and means for latching said throw out assembly in position to hold said clutching sleeve in its last mentioned position, said latching means including a pair of levers pivotally mounted within said casing and having divergent arms respectively engageable with said throw out assembly and with a hub portion of said first drive gear, means normally urging said levers in a direction to engage the arms thereof with said throw out assembly and said throw out assembly including a latching bar projecting therefrom having an upper flat surface over which the corresponding arms of the levers may engage when said throw out assembly is rocked to couple the second driven gear to the worm shaft to releasably hold said sleeve against reversing movement, said flat surface being inclined.

11. An assembly for actuating mechanism of the character described, comprising a casing having a threaded spindle projecting therethrough, an internally threaded worm wheel on said spindle, a worm shaft having a worm gear thereon in mesh with said worm wheel, a manually operable drive shaft journalled in said casing and projecting outwardly thereof, said manually operable drive shaft having a hand wheel fixed thereto externally of said casing and being provided with a first drive gear internally of the casing, an electric motor mounted on said casing and having a drive shaft projecting therefrom into the casing and having a second drive gear fixed thereto, a clutching sleeve splined to said worm shaft so as to be axially slidable thereon, a first driven gear rigid with said clutching sleeve and being in mesh with said first drive gear in a first position of said sleeve on the worm shaft, a second driven gear journalled on said worm shaft in mesh with said second drive gear, said clutching sleeve having means thereon engageable with the second driven gear in a second position of said sleeve to couple said second driven gear to the worm shaft, and means for shifting said sleeve between the two stated positions theref, said means comprising a throw out assembly pivotally mounted within said casing and having a throw out fork rigid therewith, a throw out ring on and encircling said clutching sleeve, said throw out fork engaging said ring whereby rocking motion of the throw out assembly will move said sleeve between its two stated positions, a cam wheel rigid with said second driven gear and having a cam nose thereon, a flipper assembly pivotally mounted on said throw out assembly and including a cam follower projecting therefrom and engageable with said cam wheel and positioned to be struck by the said cam nose as said second driven gear and consequently the cam wheel are rotated, abutment means on said flipper assembly and throw out assembly engageable upon pivotal movement of said flipper assembly to effect rocking of the throw out assembly as said cam follower is struck by said cam nose to shift said clutching sleeve from a position in which said first driven gear is in mesh with said first drive gear to a position in which said second driven gear is coupled to the worm shaft, means urging reverse shifting of said sleeve following the said coupling of the second driven gear to the worm shaft, and means for latching said throw out assembly in position to hold said clutching sleeve in its last mentioned position, said latching means including a pair of levers pivotally mounted within said casing and having divergent arms respectively engageable with said throw out assembly and with a hub portion of said first drive gear, means normally urging said levers in a direction to engage the arms thereof with said throw out assembly and said throw out assembly including a latching bar projecting therefrom having an upper flat surface with which the corresponding arms of the levers engage when said throw out assembly is rocked to couple the second driven gear to the worm shaft to releasably hold said sleeve against reversing movement, said flat surface being inclined to permit engagement of only one of said lever arms therewith, said hub of the first drive gear having camming means thereon for alternately engaging said lever arms to pivot them out of the overlying engaging relationship with said flat surface of the throw out assembly arm.

12. In an assembly for actuating mechanism of the character described, comprising an axially movable threaded stem, means for moving said stem axially by manual and mechanical means selectively, said means including a manually rotatable shaft and a motor driven shaft, first and second drive trains from said shafts to a common drive shaft for axially shifting said stem, and means for selectively coupling one or the other of the gear trains to said common driven shaft and including a cam wheel having a cam nose and driven by the second gear train connected from the motor driven shaft, a throw out assembly rockably mounted for movement from one position to a second position to effect uncoupling of the first drive train from and coupling the second drive train to the common driven shaft and a flipper assembly pivotally mounted on said throw out assembly and having means associated therewith normally urging the flipper assembly into a predetermined position, said flipper assembly having at least one cam follower arm thereon projecting substantially radially from its pivotal axis, the flipper assembly having a normal position in which said arm is at an acute angle to the cam wheel to be struck and actuated by the cam nose, abutment surfaces on the flipper and throw out assemblies engageable upon predetermined pivotal motion of the flipper assembly upon the throw out assembly wherein the cam follower arm projects substantially normal to the cam wheel for operating the follower, and latch means for holding the throw out assembly in said second position with the cam follower arm out of the path of movement of the associated cam wheel nose for actuating the follower arm, means urging the throw out assembly to reversely move to said one position following actuation of the latch to hold the throw out assembly, and means for releasably actuating said latch means to permit return of the throw out assembly to said one position.

13. An assembly for actuating mechanism of the character described, comprising a threaded spindle supported for reciprocal movement, a driven worm shaft having a worm and worm gear coupling with said spindle through which to effect reciprocation of the latter, a manually actuated first drive gear, a motor operated second drive gear, a tooth carrying clutch collar splined on the worm shaft, a first driven gear carried by the clutch collar for movement therewith and for selective engagement with and disengagement from the first drive gear, a second driven gear journalled on the worm shaft and in permanent toothed connection with the second drive gear, the second driven gear having a hub carrying clutch teeth for coupling with the clutch collar teeth when the clutch collar is shifted for disengagement of the first driven gear from the first drive gear, a free running throw-out ring slidable on the clutch collar, compression spring means opposing movement of the ring toward the tooth carrying end of the clutch collar, a throw-out assembly supported for rocking movement on an axis perpendicular to the worm shaft and carrying a fork coupled with said throw-out ring, a flipper assembly carried by the throw-out assembly and including a pivot pin supported on the side of the rocking axis of the throw-out assembly remote from said fork and adjacent to said second driven gear hub, a pair of spaced cam followers coupled to and swingable about the axis of said pivot pin and lying on opposite sides of a plane radial to the pivot pin and the worm shaft, a cam wheel secured on the second driven shaft hub and having a circular face oblique to the worm shaft and positioned for engagement by said cam followers, a cam nose on said cam face positioned to engage either one of said cam followers upon rotation of the cam wheel for effecting turning of the followers about said pivot pin and to also effect rocking of the throw-out assembly in a direction to shift the clutch collar into operative connection with the second driven gear hub, spring means normally resisting turning of the followers from their position on opposite sides of said plane, means for latching the throw-out assembly in clutch-collar-driven-gear-hub connection, and means for releasing said latching means upon rotation of the first driven gear.

14. The invention as defined by claim 13, wherein the penultimate means and the last means comprise a member on and turnable with the throw-out assembly to a latching position, spring means opposing turning of the throw-out assembly to said latching position, a rockably supported latch arm, means urging movement of the arm into a position of engagement with said member to hold the throw-out assembly against reverse turning under the urging of the last named spring means and a camming means carried by the first drive gear for engaging and forcing the latch arm out of engagement with the said member on the throw-out assembly.

References Cited in the file of this patent

UNITED STATES PATENTS

| | | |
|---|---|---|
| 2,592,374 | Ball | Apr. 8, 1952 |
| 2,694,320 | Kron | Nov. 16, 1954 |